(No Model.)

D. C. TERRY & W. J. MALTBY.
NUT LOCK.

No. 475,636. Patented May 24, 1892.

WITNESSES:
Fred G. Dieterich
P. B. Turpin

INVENTORS
David C. Terry
William J. Maltby
BY
Munn & Co.
ATTORNEYS

UNITED STATES PATENT OFFICE.

DAVID C. TERRY AND WILLIAM J. MALTBY, OF BAIRD, TEXAS.

NUT-LOCK.

SPECIFICATION forming part of Letters Patent No. 475,636, dated May 24, 1892.

Application filed August 19, 1889. Serial No. 321,321. (No model.)

*To all whom it may concern:*

Be it known that we, DAVID C. TERRY and WILLIAM J. MALTBY, of Baird, in the county of Callahan and State of Texas, have invented a new and useful Improvement in Nut-Locks, of which the following is a specification.

This invention is an improvement in that class of nut-locks in which so-called "jam-nuts" are turned up on the bolt against the nut to be locked; and the present invention lies, mainly, in the particular construction of the end or ends of the thread of the locking nut or washer by which to more securely and effectually lock the nut in place on the bolt; to which end it consists in certain features of construction and combination of parts, as will be hereinafter more fully described, and pointed out in the claims.

Figure 1:
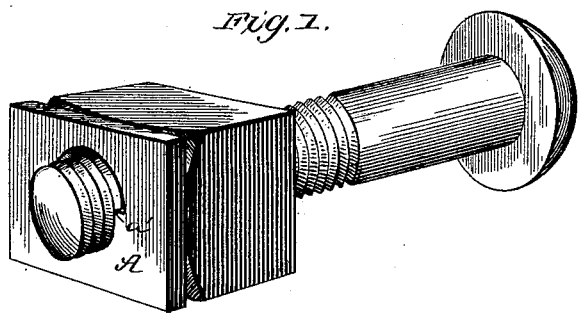
Figure 2:
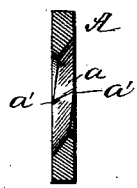
Figure 3:
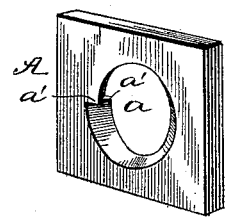
Figure 4:
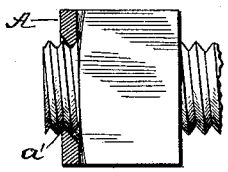

In the drawings, Figure 1 is a perspective view of a bolt and nut provided with our improvements. Figs. 2 and 3 are detail views of the locking-plate; and Fig. 4 is a side view of the nut and bolt, the locking-plate being in section.

The locking plate or washer A is made comparatively thin—that is to say, thin in comparison to the nut to be locked—and preferably only sufficiently thick to enable a single round of thread to be formed in its opening $a$. This opening $a$ is made to fit the bolt on which the lock is to be used, and is suitably threaded. By preference but a single round of thread is made in the opening $a$, and the plate A is made of such thickness that the said single round will extend from face to face of the locking-plate and its ends when blunted or cut short, as presently described, will be in the same radial line and in position to act in opposition to each other.

As a distinguishing feature of our locking plate or washer, it will be noticed that the ends of the thread do not run out of the face of the washer, but are cut short or blunted, forming what may be called a "projecting portion" $a'$, whose direction is radially into the opening $a$ and whose length, as shown, is equal to the depth of the thread.

In the use of the invention the nut to be locked is first turned on the bolt to proper position. The locking-washer is then turned on the bolt up against the nut. When thus screwed down, the projecting portion at the end of the thread follows the groove, where it begins to pass under the nut and binds or wedges in the wedge-shaped space between the thread of the bolt and the thread of the nut at the beginning of the thread of the latter, forming the lock or wedge when forced tightly together with a wrench. When so tightened, it will be seen that the thread of the bolt at the outer end of the nut is clamped between the opposite projecting portions of the locking-washer, and for such reason it is preferred to arrange such parts in the same radial line, as shown. It is preferred to make both ends of the thread blunted or cut short, as thereby either end of the locking plate or washer may be turned against the nut to be locked.

The lock-plate is simple, can be cheaply made and applied, and will be found efficient in use.

Having thus described our invention, what we claim as new is—

1. A nut-locking plate or washer having a bolt-opening $a$ formed with a single round of thread which has its opposite ends terminating in blunted shoulders $a'\ a'$, lying within the faces of the plate or washer, for the purpose described, substantially as set forth.

2. As a new article of manufacture, a flat nut-locking plate or washer having its bolt-opening $a$ formed with a single round of thread to engage with the threads of the bolt, the ends of said thread being cut short or blunted within the faces of the plate to form the shoulders $a'$, which lie radially to the axis of the bolt-opening and are adapted to wedge between the threads of the bolt and the face of the nut to be locked, substantially as described.

3. The combination, with a bolt and nut, of the metallic plate or washer arranged flat against the face of the nut and having its bolt-opening formed with a single round of thread which terminates in abrupt radial shoulders $a'\ a'$, which lie within the parallel faces of the plate and are wedged or forced between the threads of the bolt and the face of the nut, substantially as described.

DAVID C. TERRY.
WILLIAM J. MALTBY.

Witnesses:
H. E. JONES,
E. D. FAY.